116,897

UNITED STATES PATENT OFFICE.

DAVID HIBBARD WARREN, OF MONTREAL, CANADA.

IMPROVEMENT IN THE MANUFACTURE OF SOAPS.

Specification forming part of Letters Patent No. 116,897, dated July 11, 1871.

*To all whom it may concern:*

Be it known that I, DAVID HIBBARD WARREN, of Montreal, in the Dominion of Canada, have invented certain Improvements in Soaps, and in the process of making the same, of which the following is a specification:

The objects of this invention are mainly to reduce the cost and greatly shorten the time required to make soaps, as compared with the modes usually practiced, and to produce a soap that has far greater detergent properties than the soaps generally used. The substantial character of the invention will be exemplified by describing the process of making brown soap of superior quality, such as is adapted to domestic use. The process may be perhaps best understood by considering it as made up of four distinct steps or operations, which can best be carried on by four separate kettles, heated in the usual manner and placed in convenient positions in relation to each other, so that the materials may be discharged from one into another with facility.

The first operation is as follows: Take, for instance, one hundred pounds of fat of any kind usually used for the purpose, and put it into what we will call the first kettle, and heat it just enough to melt it. Then take fifty pounds of caustic-soda lye, of a specific gravity of 36° by the hydrometer commonly used by soap-makers, and pour it into this kettle cold. Then heat up the kettle to boiling, and continue the boiling till the mass becomes pasty. Then add five pounds more of the same lye and continue the boiling until it again becomes pasty, and repeat this for, say, five times, when twenty-five pounds of the lye will have been used, which, added to the fifty pounds first introduced, will probably have entirely saponified the fatty matter and left the mass somewhat caustic. The boiling or heating is continued, with an increase of the heat, until the materials in the kettle become a nearly dry pulverulent mass, and in consistency somewhat like granulated sugar or a very dry mortar, nearly all of the water in the lye having been expelled by the boiling. The full saponification of the fat is considered complete when the mass stiffens and cracks open on the surface and resists the operation of the "crutch." By this mode of operation the fat is entirely disinfected, however rancid it may be, and palm-oil is deodorized and considerably bleached. This completes the operation or process of saponification of the fat, but the heat is kept up preparatory to the next operation.

The second operation is as follows: In what we will call the second kettle one hundred and ten pounds of resin have been melted and heated nearly as hot as it will bear without changing its color. This is then poured into the hot "curds" in the first kettle, and the whole thoroughly agitated or "crutched" until the contents are intimately and evenly mixed. The introduction of the hot resin expels the water remaining in combination with the caustic soda, and thereby enables the free soda to attack and enter into intimate combination with the resin. The mixture is then boiled and agitated until it is perfectly mixed, when it becomes a transparent liquid while hot, and a transparent solid when cold, having somewhat the appearance of glue, and is a true soap.

The third operation is as follows: In the third kettle one hundred and ninety pounds of sal-soda crystals (common washing-soda) are put, with ten pounds (more or less) of silicate of soda of a viscid consistency, and the whole heated just to boiling, the water of crystallization in the sal-soda being sufficient to liquefy the mass. All solid matters that may have got into the liquid mass are to be removed by a hand or dipping-screen.

The fourth operation is as follows: Have the fourth kettle empty, but heated up about as hot as the soap will bear without scorching. Then take, say, four gallons, (more or less) in a suitable vessel, of the product of the second operation from the first or stock-kettle and pour it into the fourth kettle. Then take a proportionate quantity of the contents of the third kettle and pour it in. The union of the two takes place with the production of a hissing sound and much effervescence, which again immediately subsides. The materials are to be thoroughly stirred or crutched. This operation is thus continued until the contents of the first and third kettles are exhausted and mixed in the fourth kettle with continued stirring. This finishes the process and leaves the soap in a pasty condition, although it is hot. It is then ready to be dipped into the frames in the usual way, where it soon hardens, and as soon as it is cool it is ready to be cut up into bars in the usual way; and as it contains but a small proportion of water it may be packed into boxes immediately without the usual drying operation. The coloring and scenting materials, if used, are introduced after the soap-making is finished in the usual way. The proportions of the ingredients employed may be considerably varied, as, for instance, the sal-soda and resin, thereby modifying the quality of the soap; but the first operation described—that is, the saponification of the fat—would remain substantially the same, except so far as it was modified by the qualities of the fatty matters operated upon, and would be used for the various kinds of hard soaps, and is by itself a separable and valuable part of the invention. The proportion of rosin to the sal-soda and silicate of soda should be a little more than one-half by weight, but this can be considerably varied. If a much larger proportion of sal-soda is used it will be liable to effloresce upon the surface of the soap, which may be considered objectionable as injuring the appearance of the soap for sale, but is no injury to its detergent qualities. The soap produced by this process may be considered as a mixture of a constant quantity of fat saponified by caustic soda, with a variable quantity of resin saponified by sal-soda, to which the silicate of soda may be added or not, as desired.

A comparison of this process with the usual process of soap-making shows the following advantages, all of more or less importance: 1st, the time employed is very much shorter, as the several operations may all be completed in one day. 2d, the amount of fuel used is far less, as the repeated long boilings of the fat in weak lye are entirely avoided. 3d, the use of salt to separate the saponified fat from the lye is avoided, thereby saving the entire cost of it, as it is wholly wasted in the old process. 4th, the waste of the caustic soda which remains in the spent lye that is thrown away, and also of the saponified fat that remains in solution in the lye when it is run off, are both avoided. 5th, the small quantity of water employed in the process enables the soap to be prepared for market at once, and the time and space required for drying the soap after manufacture are mostly dispensed with. These considerations all relate simply to the economy of manufacture without reference to the intrinsic qualities of the soap produced; but in this respect, also, this process offers great advantages. It may be stated, in a general way, that the detergent power or capacity of a soap corresponds nearly to the amount of the alkali that is held in it in a soluble and neutral condition. A comparison of the composition of this soap with that usually adopted shows that the quantity of alkali contained in it in proportion to the fat employed is far greater, and, therefore, its detergent power must be correspondingly greater, as its use shows. This is mainly due to the large proportion of the sal-soda used, which is of itself a powerful detergent, and which is enabled to be done by the assistance of the large proportion of resin employed, which appears to enter into combination with the sal-soda in a manner analogous to saponification. The soap is also much harder than soaps made in the usual way, which enables it to be more economically used without impairing its efficiency.

What I claim is—

1. The method or process of saponifying fatty matters by a concentrated solution of caustic soda, substantially as is described in my first operation.

2. The process of making soap by the four successive operations, substantially as described.

3. The soap produced by the described process, substantially, as a new manufacture.

4. The saponification of resin by sal-soda, in combination with the saponification of fat by caustic soda in the manufacture of soap, substantially as described.

Executed May 23, A. D. 1871.

D. H. WARREN.

Witnesses:
G. E. WHITNEY,
WM. C. HIBBARD.